United States Patent [19]

Soederlund

[11] Patent Number: 4,868,737
[45] Date of Patent: Sep. 19, 1989

[54] METHOD AND ARRANGEMENT IN WHICH CAPACITY OF A RELATED STORAGE MEDIUM IS CHECKED WHEN BUFFERING DATA

[75] Inventor: Tom O. Soederlund, Oslo, Norway

[73] Assignee: Tandberg Data A/S, Oslo, Norway

[21] Appl. No.: 70,056

[22] Filed: Jul. 6, 1987

[30] Foreign Application Priority Data

Dec. 22, 1986 [DE] Fed. Rep. of Germany ....... 3644008

[51] Int. Cl.⁴ ............................................... G06F 3/00
[52] U.S. Cl. ..................................... 364/200; 364/239
[58] Field of Search ... 364/200 MS File, 900 MS File

[56] References Cited

U.S. PATENT DOCUMENTS

| | | | |
|---|---|---|---|
| 4,258,418 | 3/1981 | Heath | 364/200 |
| 4,486,854 | 12/1984 | Yuni et al. | 364/900 |
| 4,618,926 | 10/1986 | Kubo et al. | 364/200 |

FOREIGN PATENT DOCUMENTS 0017670 10/1980 European Pat. Off.

OTHER PUBLICATIONS

"System for Control of Residual Byte Counting", Jun. 7, 1983, vol. 7, No. 130.
"Buffer Register", Jun. 29, 1982, vol. 6, No. 116.

Primary Examiner—Raulfe B. Zache
Attorney, Agent, or Firm—Hill, Van Santen, Steadman & Simpson

[57] ABSTRACT

In a system for buffering data, a buffer memory is provided for buffering data output from a data source to an asynchronous data store. When a storage medium is provided in the data store and its storage capacity is exhausted, the data still contained in the buffer memory might not be recorded on the storage medium. Independently of the physical storage capacity of the buffer memory, the logical storage capacity thereof is dynamically adapted to the storage capacity of the data store which is still available. As long as the available storage capacity of the data store is greater than a maximum physical storage capacity of the buffer memory, the buffer memory remains unmodified. When, however, the storage capacity still available in the data store becomes less than the maximum storage capacity of the buffer memory, its logical storage capacity is reduced so that all data intermediately stored in the buffer memory can still always be stored on the storage medium.

9 Claims, 1 Drawing Sheet

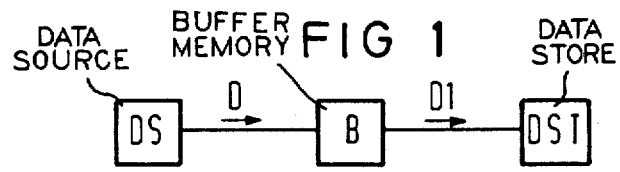
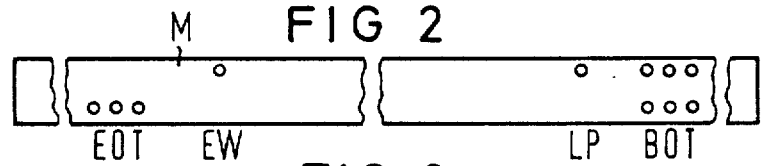
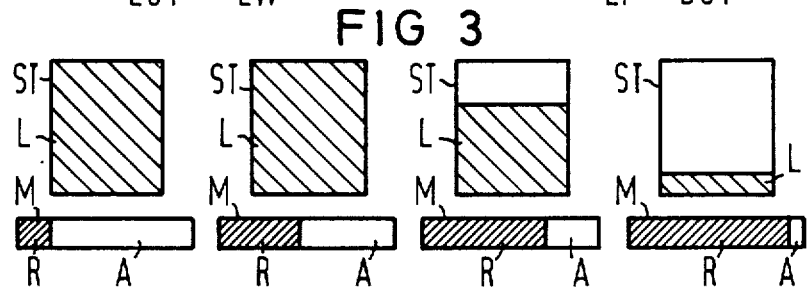
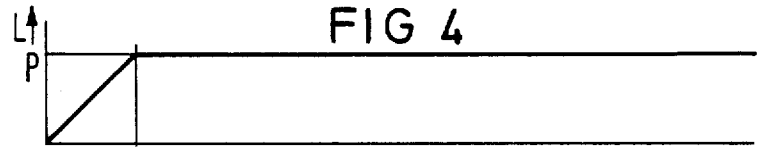
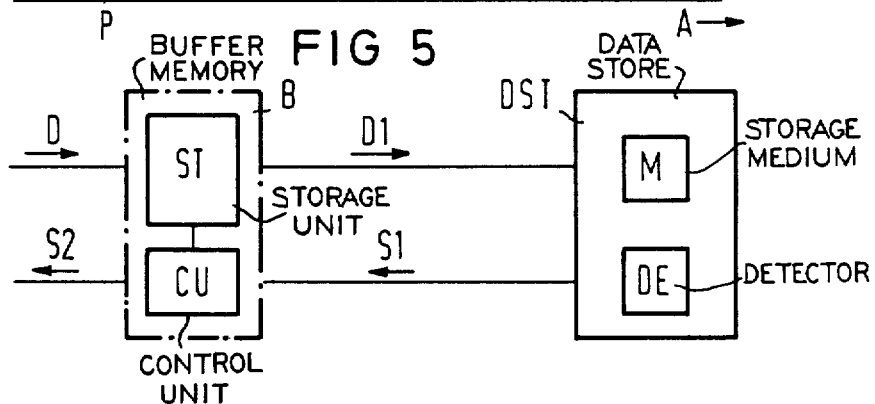

METHOD AND ARRANGEMENT IN WHICH CAPACITY OF A RELATED STORAGE MEDIUM IS CHECKED WHEN BUFFERING DATA

BACKGROUND OF THE INVENTION

1. Field of the Invention:

The invention is directed to a method for buffering data wherein data are transmitted from a data source to a data store and are stored there on a storage medium having a variable available storage capacity. A buffer memory is provided for intermediate storage of the data. The buffer memory has a prescribed physical storage capacity.

2. Description of the Prior Art:

In a transmission of data from a data source to an asynchronous data storage, the use of a buffer memory between the data source and the data storage is required. The data storage records the data on a storage medium which can be designed as a magnetic storage medium such as a magnetic tape, floppy disk or magnetic disk, or which can be fashioned as an optical plate or paper. When the storage medium is full, i.e. when there is no longer any space for storing data, there is the risk that data which are still situated in the buffer memory could be lost. This problem increases with increasing size of buffer memory.

SUMMARY OF THE INVENTION

It is therefore an object of the invention to specify a method and an arrangement with the employment of which it is assured that all data present in a buffer memory are still always capable of being recorded on the storage medium.

In a method of the type initially cited, this object is achieved by modifying the currently available storage capacity of the buffer memory dependent on the available storage capacity of the storage medium. Accordingly, the currently available storage capacity of the buffer memory is equal to its physical storage capacity as long as the available storage capacity of the storage medium is greater than this physical storage capacity of the buffer memory. The currently available storage capacity of the buffer memory is dynamically diminished when the available storage capacity of the storage medium is less than the physical storage capacity of the buffer memory. Thus, all data stored in the buffer memory are always storable on the storage medium.

Printers or plotters which record the data on paper, magnetic data stores which record the data on a magnetic tape, on a floppy disk or on a magnetic disk, and optical storages which record the data on an optical disk can also be employed as data stores.

As long as the storage capacity still available on the recording medium is greater than the physical storage capacity of the buffer memory, then in this situation, the entire logical storage capacity of the buffer memory is available. When, however, the storage medium only has an available storage capacity which is smaller than the physical storage capacity of the buffer memory, then the entire storage capacity of the buffer should no longer be used. Rather, the possible logical storage capacity of the buffer memory is dynamically reduced in accordance with the storage capacity of the storage medium which is still available. It is assured in this way that all data present in the buffer memory are still always capable of being recorded on the storage medium.

The modification of the possible storage capacity of the buffer memory can occur linearly or in steps, and in the simplest case, in one step.

BRIEF DESCRIPTION OF THE DRAWINGS

FIG. 1 is a block circuit diagram illustrating a transmission of data to a data store;

FIG. 2 is a schematic illustration of a magnetic tape;

FIG. 3 is a schematic illustration of the possible storage capacity of the buffer memory;

FIG. 4 is a graphic illustration of the possible storage capacity of the buffer memory dependent on the available storage capacity of the storage medium; and FIG. 5 is a block circuit diagram of an arrangement for the implementation of the method.

DESCRIPTION OF THE PREFERRED EMBODIMENTS

In the illustration in FIG. 1, data to be stored in a storage medium of a data store DST are output as data D from a data source DS which can be a computer or a host. The data store DST is fashioned as an asynchronous storage and the data D are supplied to the data store DST as write data D1 via a buffer memory B in order to adapt the transmission rate of the data D output from the data source DS to the recording speed of the data store DST.

There is then the risk in such a transmission that, when the available storage capacity on the storage medium is smaller than the storage capacity of the buffer memory B, all data intermediately stored therein can no longer be recorded on the storage medium.

The buffer memory B is therefore operated such that it should never contain more data D than can still be recorded on the storage medium. Otherwise the risk is present that the data D are lost, when, for example, the storage medium is taken from the data store DST, or the buffer memory B does not have its own power supply which is independent of the power supply of the data store DST, or when a transmission of the data D which could does not provide a renewed transmission of the data D which could no longer be recorded.

In the illustration in FIG. 2, a magnetic tape is provided as storage medium M, this magnetic tape, for example, being contained in a cassette. At the beginning and at the end, the magnetic tape contains holes BOT which identify the beginning of the magnetic tape, one hole LP which identifies a loading point, one hole EW which represents an early warning, and holes EOT which identify an end of the magnetic tape. For example, the magnetic tape is written in nine tracks and the last track will then end with the recognition of the first hole EOT. Although the end of the medium is defined as the early warning EW of the last track, it is possible that about 90 data blocks each having ½KB are still to be recorded onto the magnetic tape after this point has been reached When, in the least favorable case, all blocks must be recorded 15 times before they are correctly recorded, then only two to three blocks can be recorded. It would thus not be possible to still record all 90 data blocks on the magnetic tape. There is thus the risk that data blocks will be lost and this risk increases with increasing size of the buffer memory. Existing magnetic tape recorder devices for magnetic tape accommodated in cassettes have buffer memories up to 16 KB, and there is the risk that given such large buffer memories, not all data contained therein can still be recorded on the storage medium M.

The illustration in FIG. 3 schematically shows the possible logical storage capacity of a storage unit ST present in the buffer memory and shows the respectively occupied storage capacity R and the available storage capacity A of the storage medium M. When the available storage capacity of the storage medium M is greater then the physical storage capacity P of the storage unit ST, the possible or currently available logical storage capacity L corresponds to the physical storage capacity P. This is the case is the two illustrations at the left. When the available storage capacity A is smaller than the physical storage capacity P of the buffer storage unit ST, the possible or currently available logical storage capacity L of the buffer storage unit ST is correspondingly limited, so that the full physical storage capacity P thereof is no longer available. This is shown in the two illustrations at the right. What is assured in this way is that the full content of the storage unit ST can still always be stored on the storage medium M.

This relationship is graphically shown in the illustration in FIG. 4. The available storage capacity A of the storage medium M is shown in the abscissa direction and the logical, possible storage capacity L of the buffer memory B is shown in the ordinate direction. As long as the available storage capacity A is greater than the physical storage capacity P of the storage unit ST, the physical storage capacity P is also the logical, possible storage capacity L of the buffer memory B. When, however, the available storage capacity A of the storage medium M becomes smaller than the physical storage capacity P of the storage unit ST, the logical, possible storage capacity L of the storage unit ST is correspondingly reduced. This reduction can occur linearly dependent on the storage capacity A, or can also occur in steps, for example, in single-stepped fashion.

When recording data D1 onto the storage medium M, the storage capacity of the buffer memory B is always equal to the logical storage capacity L of the storage unit ST as seen proceeding from the data source DS, whereas the data store DST always sees the buffer memory B with its full physical storage capacity P. A data transmission from the data source DS to the buffer memory B is only possible when fewer data are stored in the buffer memory B then corresponds to the respective logical storage capacity L. It is thus assured that no more data than can be recorded on the storage medium M are stored on the buffer memory B at any time. When the storage medium M is full, the buffer memory B is employ and no data are lost.

Given the arrangement shown in FIG. 5 for the implementation of the method, the data output from the data source DS are supplied to the buffer memory B which has a control unit CU in addition to the storage unit ST, this control unit CU controlling the write-in and the read-out of the data D. Buffer memories B which have a constant logical storage capacity are generally known and are fashioned, for example, as what are referred to as FIFO memories (First In First Out Memories). The control unit CU is modified in comparison to a known control unit such that it is also possible to write the data D in at some other location, given, for example a FIFO memory, in order to modify the logical storage capacity L.

The data store DST, for example, is designed as a magnetic tape recorder and contains a magnetic tape as a storage medium M. The data store DST further contains a detector DE which recognizes when the available storage capacity A of the storage medium M is less than the physical storage capacity P of the storage unit ST. In a magnetic tape recorder, for example, this can occur since the clock pulses that are output by a drive motor for the magnetic tape are counted, or since the time during which the magnetic tape is moved in one direction at nominal speed is measured. It is also possible, for example, to count the drive pulses of a motor designed as a stepping motor. In any case, the length of the magnetic tape already recorded is measured and, since the full length of the magnetic tape is known, the storage capacity A which is still available can be identified therefrom. When this available storage capacity A is less than the physical storage capacity P, the data store DST emits a signal S1 to the buffer memory so that it is set to a smaller logical storage capacity L by use of the control unit CU. Whenever the storage unit ST is full, the storage control CU emits a signal S2 to the data source DS in order to inform the latter that the buffer memory B cannot accept any further data. It is assured in this may that all data intermediately stored in the buffer memory B can always still be recorded onto the storage medium M.

The buffer memory B can then contain a storage unit ST whose storage capacity is significantly greater than 16 kilobytes and it can nonetheless be assured that no data will be lost in the buffer memory B.

Although various minor changes and modifications might be proposed by those skilled in the art, it will be understood that I wish to include within the claims of the patent warranted hereon all such changes and modifications as reasonably come within my contribution to the art.

I claim as my invention:

1. A method for buffering data, comprising steps of:
    transmitting data from a data source to a data store via a buffer memory, a storage medium of the data store having a variable available storage capacity and the buffer memory having a prescribed physical storage capacity; and
    modifying a currently available storage capacity of the buffer memory dependent on the available storage capacity of the storage medium such that the currently available storage capacity of the buffer memory is equal to said physical storage capacity thereof as long as the available storage capacity of the storage medium is greater than said physical storage capacity of the buffer memory, and wherein the currently available storage capacity of the buffer memory is dynamically diminished when the available storage capacity of the storage medium is less than said physical storage capacity of the buffer memory, so that all data stored in the buffer memory are always storable on the storage medium.

2. A method according to claim 1 wherein the currently available storage capacity of the buffer memory is modified in steps.

3. A method according to claim 1 wherein the currently available storage capacity of the buffer memory is modified in single steps.

4. A method according to claim 1 wherein the available storage capacity of the storage medium of the data store is identified and is communicated to the buffer memory.

5. A method for buffering data, comprising steps of:
    transmitting data from a data source to a data store via a buffer memory, the data store having a storage medium having a variable available storage capacity; and reducing available storage capacity of the buffer memory to be less than said maximum storage capacity dependent on the available storage capacity of the storage medium such that the maximum storage capacity of the buffer memory is provided as long as the available storage capacity of the buffer memory, and wherein the available storage capacity of the buffer memory is dynamically diminished below the maximum capacity when the variable storage capacity of the storage medium is less than said maximum storage capacity of the buffer memory, so that all data stored in the buffer memory are always storable on the storage medium.

6. A system for buffering data, comprising:

a data source connecting to a data store through a buffer memory;

said buffer memory having a control means and a storage capacity of said storage unit; and said data store having a storage medium and a detector means, said detector means identifying an available storage capacity of the storage medium and outputting a signal to said control means when the available storage capacity is less than a physical storage capacity of said storage unit so that said control means can reduce the currently available storage capacity of the storage unit.

7. A system according to claim 6 wherein said storage medium of said data store is selected from a group consisting of a magnetic storage, an optical storage, a printer, or a plotter.

8. A system according to claim 6 wherein said data store storage medium comprises a magnetic tape recorder and said detector means identifies a length of a magnetic tape serving as said storage medium which is still respectively available for recording on.

9. A system for buffering data, comprising:

a data source connecting to a data store through a buffer memory;

said buffer memory having a control means and a storage unit, said control means selectively reducing a currently available storage capacity of said storage unit below a maximum storage capacity thereof; and said data store having a storage medium and a detector means, said detector means identifying an available storage capacity of the storage medium and outputting a signal to said control means when the available storage capacity is less than said maximum storage capacity of said storage unit so that said control means can then reduce the currently available storage capacity of the storage unit so that all data stored in the buffer memory can be stored in the storage medium.

* * * * *